United States Patent
Robey et al.

(10) Patent No.: US 10,941,632 B2
(45) Date of Patent: Mar. 9, 2021

(54) AUTONOMOUS ANNULAR PRESSURE CONTROL ASSEMBLY FOR PERFORATION EVENT

(71) Applicant: HALLIBURTON ENERGY SERVICES, INC., Houston, TX (US)

(72) Inventors: Richard Ellis Robey, Mansfield, TX (US); James Marshall Barker, Mansfield, TX (US); Kuo-Chiang Chen, Kennedale, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 331 days.

(21) Appl. No.: 15/781,577

(22) PCT Filed: Jan. 27, 2016

(86) PCT No.: PCT/US2016/015089
§ 371 (c)(1),
(2) Date: Jun. 5, 2018

(87) PCT Pub. No.: WO2017/131659
PCT Pub. Date: Aug. 3, 2017

(65) Prior Publication Data
US 2020/0263514 A1    Aug. 20, 2020

(51) Int. Cl.
*E21B 43/116* (2006.01)
*E21B 34/06* (2006.01)
(Continued)

(52) U.S. Cl.
CPC .............. *E21B 34/06* (2013.01); *E21B 21/08* (2013.01); *E21B 34/063* (2013.01); *E21B 36/00* (2013.01);
(Continued)

(58) Field of Classification Search
CPC ........ E21B 21/08; E21B 34/063; E21B 36/00; E21B 47/06; E21B 43/117; E21B 2200/06; E21B 43/11; E21B 43/116
See application file for complete search history.

(56) References Cited

U.S. PATENT DOCUMENTS

| 4,509,604 A | 4/1985 | Upchurch |
| 4,633,945 A | 1/1987 | Upchurch |

(Continued)

FOREIGN PATENT DOCUMENTS

| CN | 2443145 B | 8/2001 |
| GB | 2405968 A | 1/2005 |

(Continued)

OTHER PUBLICATIONS

International Search Report and Written Opinion issued by Korean IPO regarding PCT/US16/15089, dated Oct. 18 2016, 14 pages dated Oct. 18, 2016.

(Continued)

*Primary Examiner* — Brad Harcourt
(74) *Attorney, Agent, or Firm* — Haynes and Boone, LLP (57) ABSTRACT

A system and method of controlling a dynamic time-pressure profile associated with a perforation event that includes extending a perforation assembly within a casing string; firing a perforation gun of the perforation assembly; measuring, using a sensor of the perforation assembly, pressure within the casing string, wherein the measured pressure forms the dynamic time-pressure profile; identifying a first measured pressure within the dynamic time-pressure profile; identifying, using a controller of the perforation assembly, a first difference between the first measured pressure and a first reference pressure; and adjusting, using a first pressure generator of the perforation assembly, the pressure in response to the first difference to control the dynamic (Continued)

time-pressure profile; wherein the sensor, the controller, and the first pressure generator provide a feedback control loop.

19 Claims, 7 Drawing Sheets

(51) Int. Cl.

| | | |
|---|---|---|
| E21B 47/06 | (2012.01) | |
| E21B 43/119 | (2006.01) | |
| E21B 21/08 | (2006.01) | |
| E21B 36/00 | (2006.01) | |
| E21B 43/117 | (2006.01) | |
| F16K 31/00 | (2006.01) | |
| F15B 15/19 | (2006.01) | |

(52) U.S. Cl.
CPC .......... *E21B 43/116* (2013.01); *E21B 43/117* (2013.01); *E21B 43/119* (2013.01); *E21B 47/06* (2013.01); *F16K 31/00* (2013.01); *E21B 2200/06* (2020.05); *F15B 15/19* (2013.01)

(56) References Cited

U.S. PATENT DOCUMENTS

| | | |
|---|---|---|
| 4,862,964 A | 9/1989 | George et al. |
| 5,088,557 A | 2/1992 | Ricles et al. |
| 6,021,377 A | 2/2000 | Dubinsky et al. |
| 6,046,685 A | 4/2000 | Tubel |
| 6,598,682 B2 | 7/2003 | Johnson et al. |
| 6,732,798 B2 | 5/2004 | Johnson et al. |
| 6,885,918 B2 | 4/2005 | Harmon et al. |
| 7,036,594 B2 | 5/2006 | Walton et al. |
| 7,121,340 B2 | 10/2006 | Grove et al. |
| 7,147,059 B2 | 12/2006 | Hirsch et al. |
| 7,222,022 B2 | 5/2007 | Kneissl et al. |
| 7,243,725 B2 | 7/2007 | George et al. |
| 7,278,480 B2 | 10/2007 | Longfield et al. |
| 7,284,612 B2 | 10/2007 | Ratanasirigulchai et al. |
| 7,428,921 B2 | 9/2008 | Grove et al. |
| 7,571,768 B2 | 8/2009 | Cuthill |
| 7,905,285 B2 | 3/2011 | Cuthill |
| 7,980,309 B2 | 7/2011 | Crawford |
| 8,285,200 B2 | 10/2012 | Backholm et al. |
| 8,302,688 B2 | 11/2012 | Burleson et al. |
| 8,319,657 B2 | 11/2012 | Godager |
| 8,336,437 B2 | 12/2012 | Barlow et al. |
| 8,672,031 B2 | 3/2014 | Vaynshteyn |
| 8,726,996 B2 | 5/2014 | Busaidy et al. |
| 8,807,003 B2 | 8/2014 | Le et al. |
| 8,899,320 B2 | 12/2014 | Le et al. |
| 8,985,200 B2 | 3/2015 | Rodgers et al. |
| 9,020,431 B2 | 7/2015 | Bell et al. |
| 2004/0231840 A1 | 11/2004 | Ratanasirigulchai et al. |
| 2005/0247449 A1 | 11/2005 | George et al. |
| 2006/0131014 A1* | 6/2006 | Huang .................. E21B 47/12 166/250.07 |
| 2009/0084552 A1 | 4/2009 | Behrmann et al. |
| 2009/0272527 A1 | 11/2009 | Cuthill |
| 2011/0132608 A1 | 6/2011 | Busaidy et al. |
| 2012/0018156 A1 | 1/2012 | Grove et al. |
| 2012/0037380 A1 | 2/2012 | Arizmendi, Jr. et al. |
| 2012/0125627 A1 | 5/2012 | George et al. |
| 2013/0008655 A1 | 1/2013 | Le et al. |
| 2013/0220613 A1 | 8/2013 | Brooks et al. |
| 2013/0327536 A1 | 12/2013 | Alexander et al. |
| 2014/0216763 A1 | 8/2014 | Kalb et al. |
| 2014/0299322 A1 | 10/2014 | Underdown |
| 2015/0000509 A1 | 1/2015 | Current et al. |
| 2015/0096752 A1 | 4/2015 | Burgos et al. |
| 2015/0176374 A1 | 6/2015 | Lagrange et al. |
| 2015/0285063 A1 | 10/2015 | Purkis |

FOREIGN PATENT DOCUMENTS

| | | |
|---|---|---|
| WO | 2014123510 A1 | 8/2014 |
| WO | 2015060818 A1 | 4/2015 |
| WO | 2015099634 A1 | 7/2015 |

OTHER PUBLICATIONS

Wu et al., Simultaneous Multifracture Treatments: Fully Coupled Fluid Flow and Fracture Mechanics for Horizontal Wells, Society of Petroleum Engineers, Apr. 2015 SPE Journal, pp. 337-346.

Chadha et al; A combination of Perforating Technologies to Maximize Well Productivity and Minimize Rig Time Feb. 2, 2012, 10 pages.

Jumaat, Repeat Dynamic Underbalance Perforating in Oman, Dynamic Underbalance Dec. 31, 2013, 10 pages.

Bakker et al., The New Dynamics of Underbalanced Perforating, Oilfield Review, Dec. 31, 2003, pp. 54-67.

Canadian Intellectual Property Office, Application No. 3012627, Examiner's Letter, dated May 22, 2019, 3 pages.

International Preliminary Report on Patentability, International Application No. PCT/US2016/064330, dated Jul. 31, 2018, 11 pages.

International Search Report and Written Opinion issued by the Korean Intellectual Property Office regarding International Application No. PCT/US2016/064330, dated Mar. 15, 2017, 15 pages.

* cited by examiner

AUTONOMOUS ANNULAR PRESSURE CONTROL ASSEMBLY FOR PERFORATION EVENT

PRIORITY

The present application is a U.S. National Stage patent application of International Patent Application No. PCT/US2016/015089, filed on Jan. 27, 2016, the benefit of which is claimed and the disclosure of which is incorporated herein by reference in its entirety.

TECHNICAL FIELD

The present disclosure relates generally a perforation assembly, and specifically, to an autonomous annular pressure control assembly for a perforation event.

BACKGROUND

During a perforating event of a casing string that extends within a wellbore, a transient pressure response occurs when the initially static pressures of the well perforator, wellbore, and surrounding reservoir are dynamically connected. This response is very rapid—on the order of milliseconds—and the shape of the pressure profile is dependent on factors such as the surrounding reservoir characteristics, the wellbore, and a well perforating system associated with the event. Often, the creation of a dynamic pressure overbalance and/or pressure underbalance is desired to produce a specific transient time-pressure profile during the perforating event. A pressure underbalance allows perforations to surge and clean, and also lowers the skin effect due to damage in the formation. A pressure overbalance aids in perforation formation breakdown performance. A reference time-pressure profile may include one or more pressure underbalance or overbalances during the transient pressure response, and generally, balances often-competing mechanisms such as formation production/infectivity, perforation tunnel stability, sand control, and gun and wellbore integrity. Thus, the reference time-pressure profile for the perforating event may be specific to that perforating event and may be based on the factors associated with the reservoir, the wellbore, and the gun system. However, a pressure control assembly for perforation events is assembled and "set" before the assembly is extended downhole. Thus, regardless of unknown factors that may arise downhole before or during the perforating event, the assembly performs according to the previously-loaded instructions that are based on the reference time-pressure profile. That is, there is no opportunity to adjust the settings or instructions of the assembly if unknown or unaccounted factors arise that cause the transient time-pressure profile to depart from the reference time-pressure profile. This may result in deviations between an actual downhole pressure and a reference time-pressure profile, which may result in burst guns, a parted string, collapsed and/or buckled tubing, packer movement, and less than optimal production.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

DETAILED DESCRIPTION

Illustrative embodiments and related methods of the present disclosure are described below as they might be employed in an autonomous annular pressure control assembly for a perforation event and method of operating the same. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

The foregoing disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "down-hole," "upstream," "downstream," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures. For example, if the apparatus in the figures is turned over, elements described as being "below" or "beneath" other elements or features would then be oriented "above" the other elements or features. Thus, the exemplary term "below" may encompass both an orientation of above and below. The apparatus may be otherwise oriented (rotated 90 degrees or at other orientations) and the spatially relative descriptors used herein may likewise be interpreted accordingly.

Figure 1:
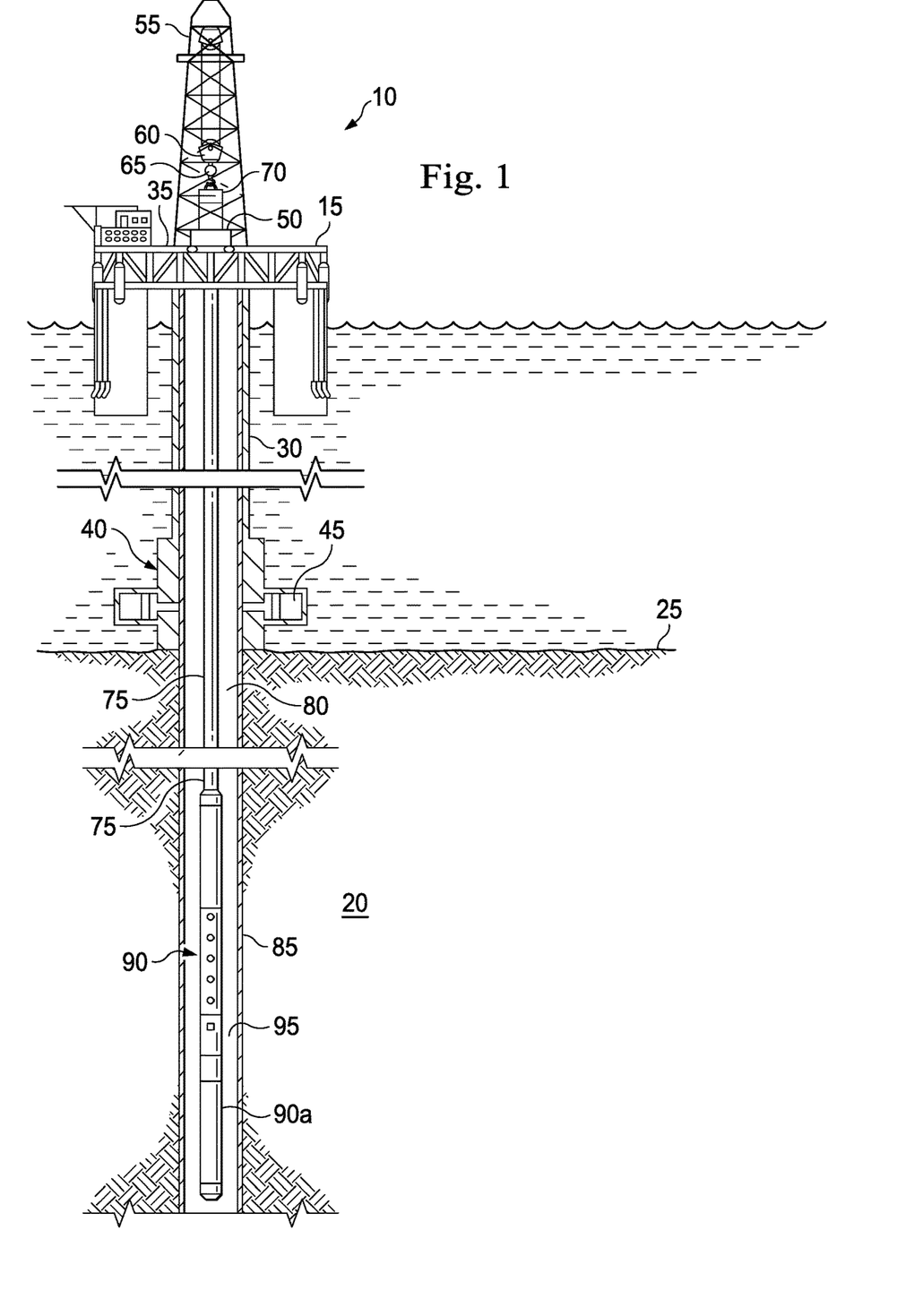
FIG. 1 is a schematic illustration of an offshore oil and gas platform operably coupled to an autonomous annular pressure control assembly for a perforation event, according to an exemplary embodiment of the present disclosure.

FIG. 1 is a schematic illustration of an offshore oil and gas platform generally designated 10, operably coupled by way of example to an autonomous annular pressure control assembly for a perforation event, according to the present disclosure. Such an assembly could alternatively be coupled to a semi-sub or a drill ship as well. Also, even though FIG. 1 depicts an offshore operation, it should be understood by those skilled in the art that the apparatus according to the present disclosure is equally well suited for use in onshore operations. By way of convention in the following discussion, though FIG. 1 depicts a vertical wellbore, it should be understood by those skilled in the art that the apparatus according to the present disclosure is equally well suited for use in wellbores having other orientations including horizontal wellbores, slanted wellbores, multilateral wellbores or the like. Accordingly, it should be understood by those skilled in the art that the use of directional terms such as "above," "below," "upper," "lower," "upward," "downward," "uphole," "down-hole" and the like are used in relation to the illustrative embodiments as they are depicted in the figures, the upward direction being toward the top of the corresponding figure and the downward direction being toward the bottom of the corresponding figure, the uphole direction being toward the surface of the well, the down-hole direction being toward the toe of the well.

Referring still to the offshore oil and gas platform example of FIG. 1, a semi-submersible platform 15 may be positioned over a submerged oil and gas formation 20 located below a sea floor 25. A subsea conduit 30 may extend from a deck 35 of the platform 15 to a subsea wellhead installation 40, including blowout preventers 45. The platform 15 may have a hoisting apparatus 50, a derrick 55, a travel block 60, a hook 65, and a swivel 70 for raising and lowering pipe strings, such as a substantially tubular, axially extending running string 75.

As in the present example embodiment of FIG. 1, a borehole or wellbore 80 extends through the various earth strata including the formation 20, with a portion of the wellbore 80 having a casing string 85 cemented therein. Disposed within the casing string 85 of the wellbore 80 is an autonomous annular pressure control assembly 90, which forms an annulus 95 between an external surface 90a of the perforating assembly 90 and the casing string 85.

Figure 2:
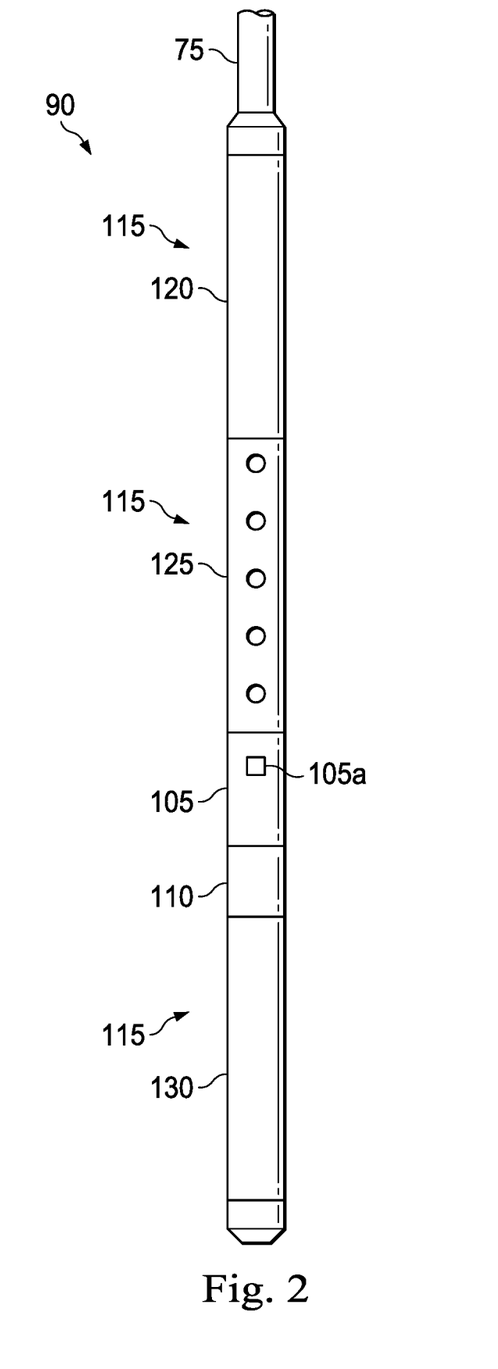
FIG. 2 illustrates a side view of the assembly of FIG. 1, according to an exemplary embodiment of the present disclosure.

FIG. 2 illustrates a side view of the assembly 90, which generally includes a sensor sub 105; a controller 110; and one or more pressure adjusting devices ("PADs") 115, such as a pressure increasing device 120, a perforation gun 125, and a pressure reducer, or a pressure decreasing device 130. Generally, each of the PADs 115 is a pressure generator that temporarily adjusts the annular pressure of the fluid with the annulus 95.

The perforation gun 125 is a downhole tool that perforates the casing string 85. The perforation gun 125 may include shaped charges (not shown); a detonating cord (not shown); a detonator (not shown); and a conveyance for the shaped charges (not shown). While one perforation gun 125 is shown in FIG. 2, any number of perforation guns may be located along the assembly 90 and/or the running string 75.

The sensor sub 105 may include a sensor 105a, such as a pressure sensor, a temperature sensor, and/or an acceleration sensor. The sensor 105a may be mechanical or electronic. For example, the sensor 105a may be a pressure transducer; a piezoelectric sensor; a strain gage; or any other similar electronic sensor. Additionally, the sensor 105a may include one or more pistons (with or without being coupled to a reference chamber charged to a predetermined pressure); a rupture disk or a series of rupture disks; a shear set, such as shear pins; or any other similar mechanical sensor. Generally, the sensor 105a is in communication with a liquid, such as a fluid, that is within the annulus 95 and measures an annular pressure of the liquid within the annulus 95. The assembly 90 may include one sensor 105a or any number of sensors spaced along the assembly 90 and/or the running string 75.

The pressure increasing device 120 is a device that temporarily increases the pressure within the annulus 95. For example, the pressure increasing device 120 may be a mechanism or tool that includes an energetic material that is initiated in a variety of methods, such as for example through the use of electronic or mechanical percussion or upon impact, etc. The energetic material may include explosives or propellants to generate gas and the like. Alternatively, the pressure increasing device 120 may be a mechanism or tool that includes exothermic material to generate heat and thus cause a pressure increase, or may include a combination of energetic and exothermic material. While the pressure increasing device 120 is shown located above the perforation gun 125 in FIG. 2, the pressure increasing device 120 may be located anywhere along the assembly 90. Additionally, the pressure increasing device 120 may be one of a plurality of pressure increasing devices located along the assembly 90 and/or the running string 75.

The pressure decreasing device 130 is a device that temporarily decreases the pressure within the annulus 95. For example, the pressure decreasing device 130 may be a mechanism or tool that includes an atmospheric chamber. The atmospheric chamber may be introduced or placed in communication with the fluid in the annulus 95 in a variety of ways, such as for example via energetic venting or mechanical venting. The energetic venting may include a shaped charge shooting through to penetrate a wall separating the atmospheric chamber and the fluid in the annulus 95. The mechanical venting may include rupturing of a rupture disk or exposure of a volume via a sliding sleeve. Alternatively, the pressure decreasing device 130 may be a mechanism or tool that includes a mandrel or housing that allows for a change in internal volume of the mandrel or housing, to allow for fluid in the annulus 95 to enter a previously unavailable volume within the mandrel or mandrel to reduce the pressure of the fluid in the annulus 95. Moreover, the pressure decreasing device 130 may be a mechanism or tool that includes an endothermic material that removes heat when actuated and thus causes a pressure reduction in the fluid in the annulus 95. In one embodiment, the pressure decreasing device 30 is an energy sink. While the pressure decreasing device 130 is shown located below the perforation gun 125 in FIG. 2, the pressure decreasing device 130 may be located anywhere along the assembly 90. Additionally, the pressure decreasing device 130 may be one of a plurality of pressure decreasing device 130 located along the assembly 90 and/or the running string 75.

Figure 3A:
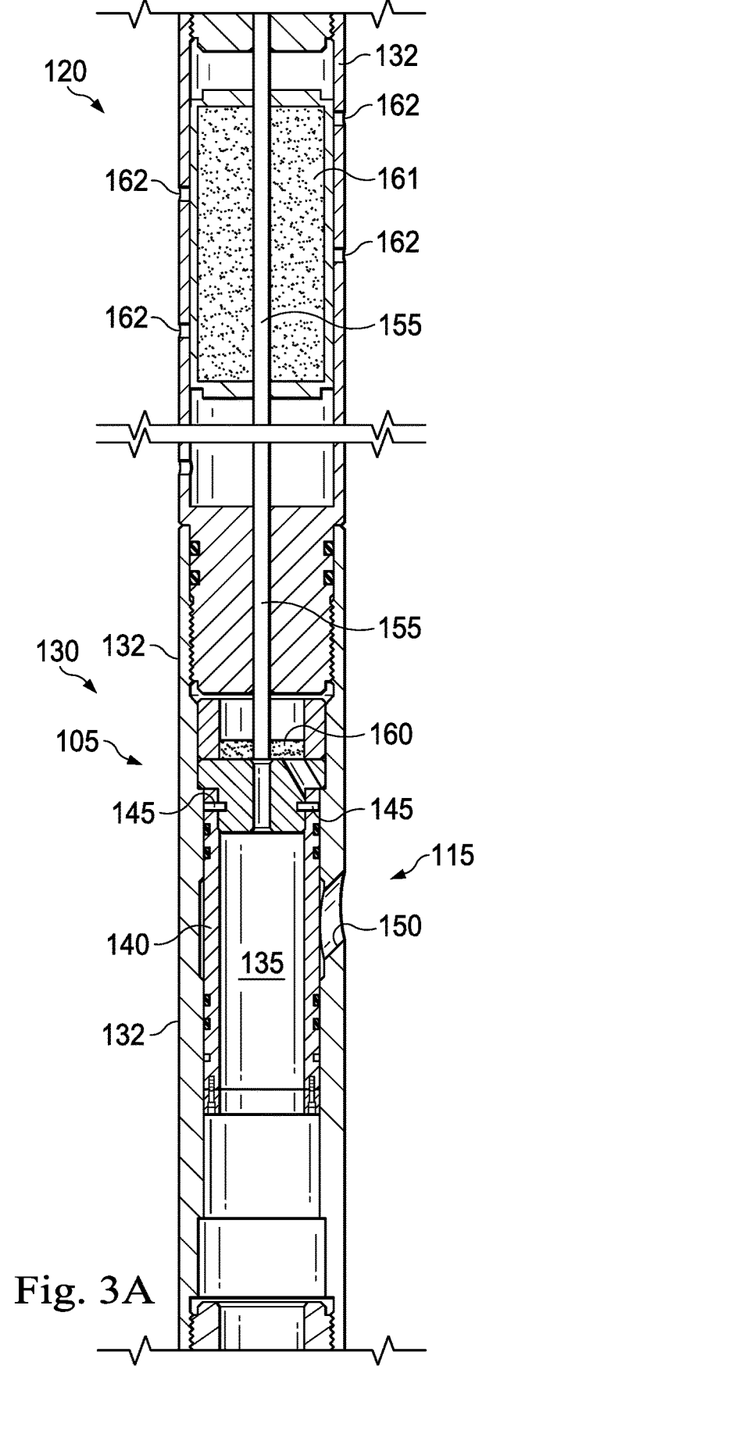
FIG. 3A illustrates a sectional view of a portion of the assembly of FIG. 1 in a first configuration, according to an exemplary embodiment of the present disclosure.
Figure 3B:
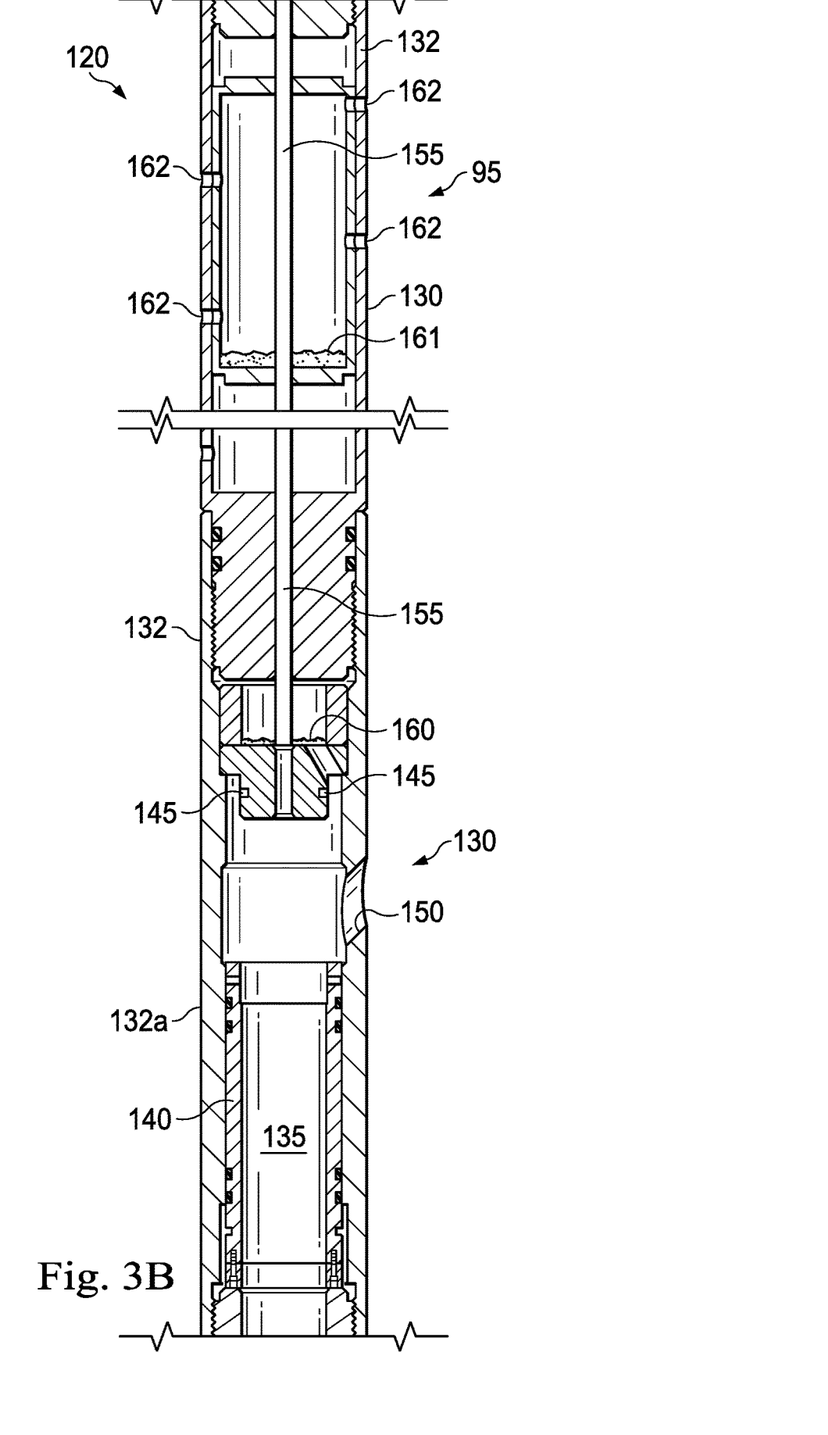
FIG. 3B illustrates a sectional view of the portion of the assembly of FIG. 3A in a second configuration, according to an exemplary embodiment of the present disclosure.

FIGS. 3A and 3B are sectional views of a portion of one embodiment of the assembly 90 in which the pressure decreasing device 130 is a mechanical vent of an atmospheric chamber and the pressure increasing device 120 is an energetic material that is a propellant. The assembly 90 as shown in FIG. 3A is in a first position in which the pressure decreasing device 130 is in the set position and the pressure increasing device 120 is in the set position. The assembly 90 of FIG. 3A includes a tubular 132 that forms an interior passage 135. A sliding sleeve 140 is disposed within the passage 135 and secured, using a plurality of shear pins 145, relative to the tubular 132. The shear pins 145 prevent or limit axial movement of the sliding sleeve 140 relative to the tubular 132, with the sliding sleeve blocking a port 150 extending through an external wall of the tubular 132. Thus, when in the first position, a volume within the sliding sleeve 140 is fluidically isolated from an external surface 132a of the tubular 132 and the fluid within the annulus 95. A detonator 155 extends within the tubular 132 and is in contact with propellant a puck 160. The assembly 90 also includes a propellant 161 that is accommodated within another portion of the interior passage 135 of the tubular 132 proximate one or more ports 162 that extend through the external wall of the tubular 132. When the detonator 155 detonates the propellant puck 160, the puck 160 deflagrates and creates gas. This, in turn, causes the sliding sleeve 140 to shear the shear pins 145 so that the sliding sleeve 140 can move axially relative to the tubular 132 to unblock the port 150. That is, after the propellant puck 160 is detonated, the port 150 is "opened" and a volume of fluid that is located near the external surface 132a of the tubular 132—in this case fluid within the annulus 95—enters the passage 135 of the tubular 132 to temporarily reduce the annular pressure of the fluid or gas within the annulus 95. Additionally, when the detonator 155 detonates the propellant 161, an energetic reaction is produced and the products of the energetic reaction are directed through ports 162 to temporarily increasing the annular pressure of the fluid or gas within annulus 95. The assembly 90 as shown in FIG. 3B is in a second position in which the propellant puck 160 of the pressure decreasing device 130 has been detonated and the propellant 161 of the pressure increasing device 120 has been detonated. The assembly 90 as shown in FIGS. 3A and 3B is only one example, and there are multiple different pressure decreasing devices 130 and pressure increasing devices 120. For example, the propellant could be ignited in several small incremental doses that have fast burn transients and multiple igniters on multiple propellants causing a fast-burn, quick-rising transient pressure increases or decreases (when introducing atmospheric chambers to the fluid within the annulus 95). Alternatively, the assembly 90 may include metered or pressure-biased propellant. For clarity, a single detonating means initiated by the controller 110 for the PADs 115 is shown along the running string 75. However, in other embodiments, parallel and independent detonating means may be provided for each of the PADs 115 in the running string 75 with independent and parallel sensors 105a connected to the controller 110.

Figure 4:
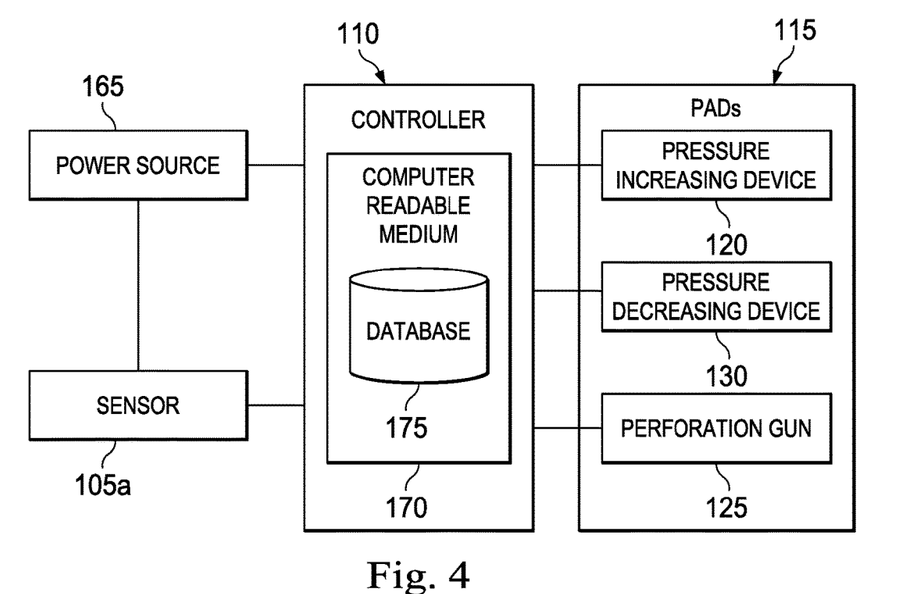
FIG. 4 is a diagrammatic illustration of a portion of the assembly of FIG. 1 that provides a feedback control loop, according to an exemplary embodiment of the present disclosure.

FIG. 4 is a diagrammatic illustration of a portion of the assembly 90 that includes the controller 110, the PADs 115, and the sensor 105a. As shown in FIG. 4, the controller 110 includes a computer readable medium 170 operably coupled thereto and a database 175 that is stored in the computer readable medium 170. Instructions accessible to, and executable by, the controller 110 are stored on the computer readable medium 170. In some embodiments, data such as for example, data relating to a reference time-pressure profile or a plurality of reference time-pressure profiles, data relating to a maximum underbalance pressure, data relating to a maximum overbalance pressure, data relating to a peak measured overbalance pressure, and data relating to a peak measured underbalance pressure is stored within the database 175. Additionally and as shown, the sensor 105a, the pressure increasing device 120, the pressure decreasing device 130, and the perforation gun 125 are in communication with the controller 110. The controller 110 may also be in communication with a power source 165 such that the controller 110 is powered by the power source 165. The power source 165 may be a battery, a generator, a "wireline," and the like. In some embodiments, the assembly 90 may also include a telemetry module (not shown), which may be wired or wireless. Additionally, the sensor 105a may be in communication with the power source 165 such that the sensor 105a is powered by the power source 165. In an exemplary embodiment, the controller 110 is a proportional—integral—derivative controller (PID controller).

Figure 5:
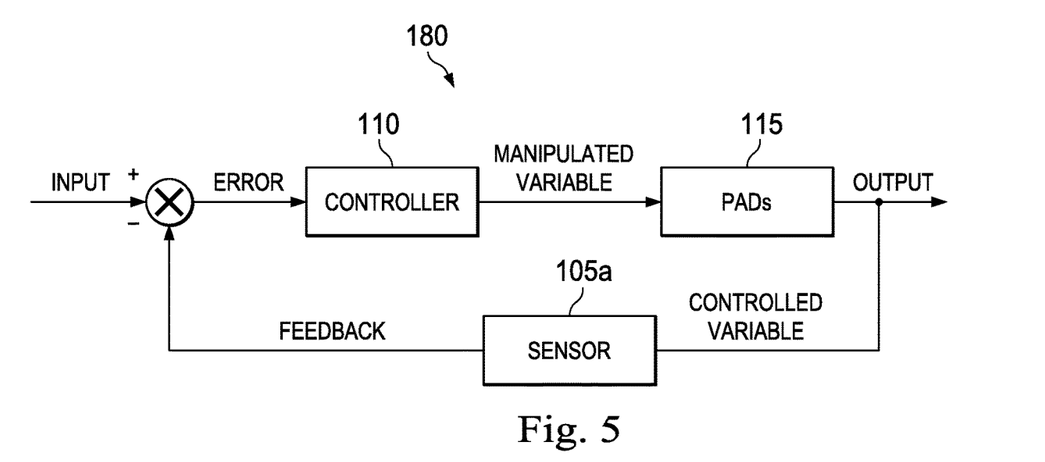
FIG. 5 is a diagrammatic illustration of the feedback control loop of FIG. 4, according to an exemplary embodiment of the present disclosure.

FIG. 5 is a diagrammatic illustration of a feedback control loop 180 that is formed from the controller 110, at least one of the PADs 115, and the sensor 105a. Generally, data stored in the database 175, such as a reference pressure, is the input for the feedback control loop 180. However, when the reference pressure is a peak measured overbalance or a peak measured underbalance pressure, the reference pressure may be a historical measured annular pressure, or a previously measured annular pressure. The controlled variable is the annular pressure of the fluid within the annulus 95 and is measured by the sensor 105a. The measured annular pressure is the feedback for the feedback control loop 180 and is compared to the input to identify an error, or a difference, between the feedback and the input. Based on the difference between the measured annular pressure and the reference pressure, the controller 110 manipulates or adjusts the annular pressure of the fluid within the annulus 95 by actuating one of the PADs 115. The actuation of one of the PADs 115 affects the annular pressure of the fluid within the annulus 95, which is then measured by the sensor 105a and then compared to the reference pressure. This loop continues so that the annular pressure is controlled using the feedback control loop 180 within the assembly 90. The reference pressure may be time-independent, such as when the reference pressure is a maximum overbalance pressure or maximum underbalance. However, the reference pressure may be time-dependent. Thus, the reference pressure or input to the feedback control loop 180 may change during the perforation event. Additionally, the reference pressure may be relative to the measured annular pressure itself, such as when the reference pressure is a peak measured overbalance or underbalance pressure. Regardless, using a reference pressure that is time-dependent, time-independent, or relative to the measured annular pressure itself as the input to the feedback control loop 180 results in the assembly 90 controlling the dynamic transient time-pressure profile, or the time-pressure profile that is based on the measured annular pressure.

Figure 6:
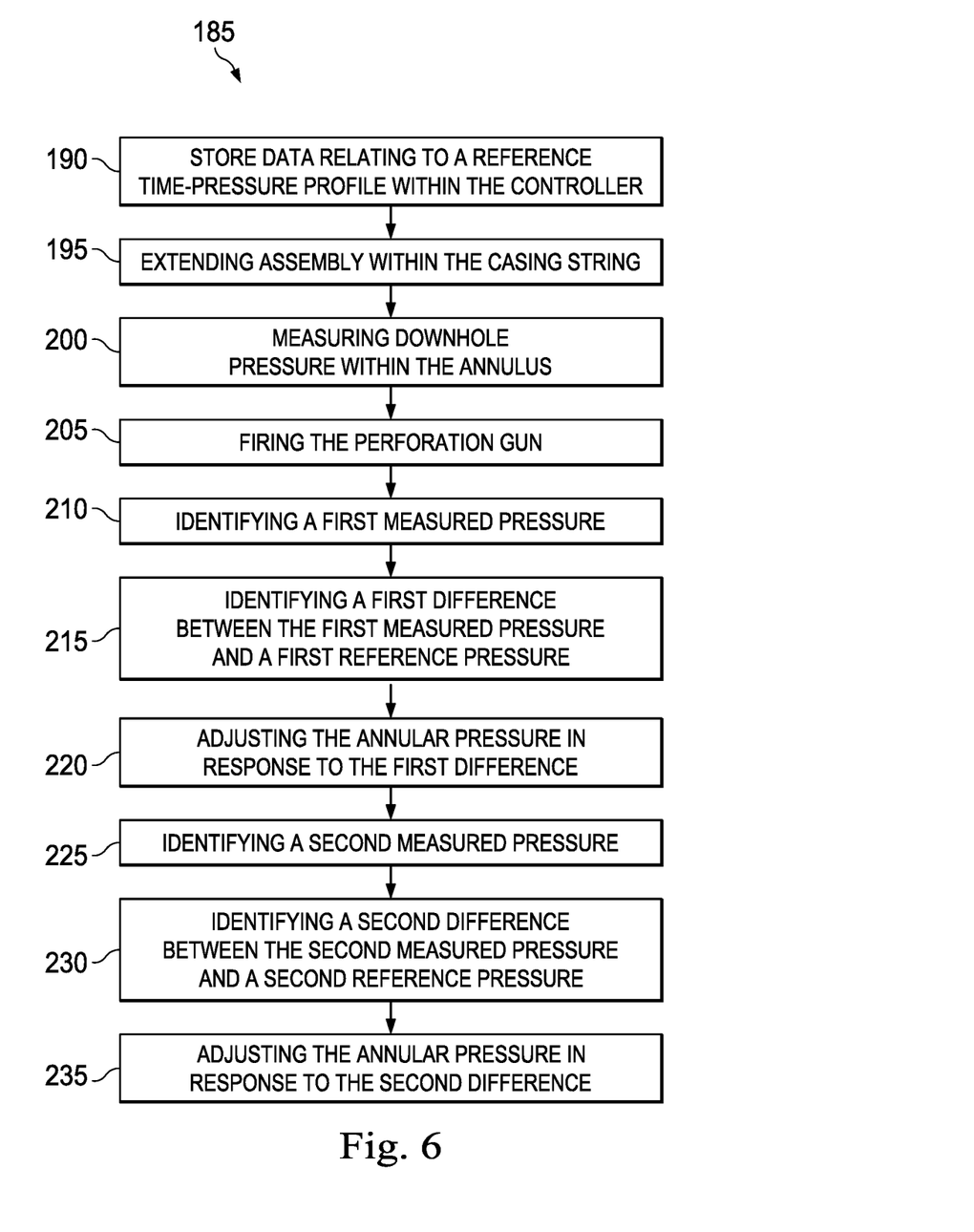
FIG. 6 illustrates a method of operating the assembly of FIG. 1, according to an exemplary embodiment of the present disclosure.

FIG. 6 illustrates a method of operating the assembly 90. The method is generally referred to by the reference numeral 185 and includes storing data relating to reference time-pressure profile within the controller 110 at step 190; extending the assembly 90 within the casing string 85 at step 195; measuring the downhole pressure within the annulus 95 at step 200; firing the perforation gun 125 at step 205; identifying a first measured pressure at step 210; identifying a first difference between the first measured pressure and a first reference pressure at step 215; adjusting the annular pressure based on the first difference at step 220; identifying a second measured pressure at step 225; identifying a second difference between the second measured pressure and a second reference pressure at step 230; and adjusting the annular pressure in response to the second difference at step 235.

Figure 7:
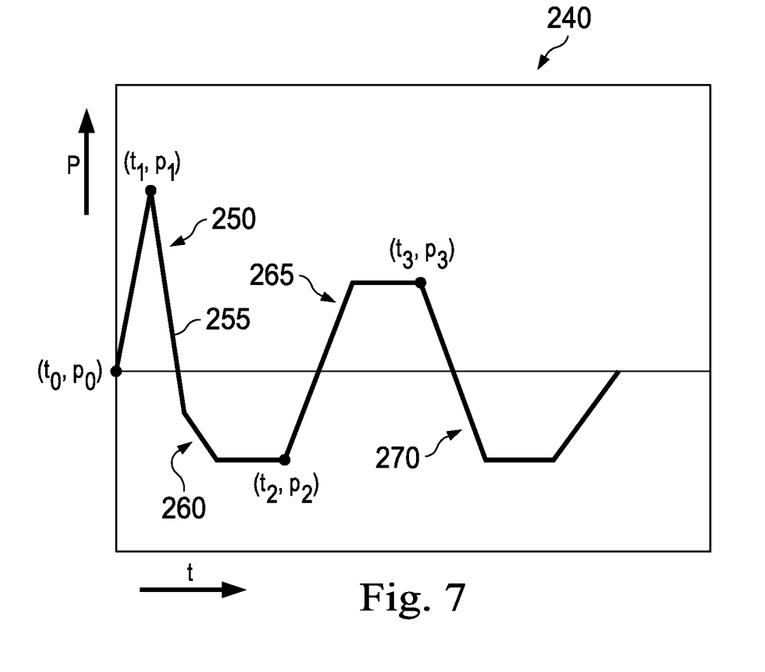
FIG. 7 is a graph illustrating a reference time-pressure profile, according to an exemplary embodiment of the present disclosure.

At the step 190, data relating to the reference time-pressure profile is stored within the assembly 90. FIG. 7 is a graph generally referred to by the reference numeral 240 that illustrates an example of the reference time-pressure profile associated with a perforation event. As shown in FIG. 7, the reference time-pressure profile 240 includes a sudden surge 250 in pressure (reference pressure depicted by the line 255) followed by: a first underbalance 260; an overbalance 265; and then a second underbalance 270. Reference pressures associated with the time-pressure profile 240 may include a pressure at the point (t1, p1); a pressure at the point (t2, p2); and a pressure at the point (t3, p3). The point (t1, p1) is defined by a peak overbalance pressure created by the firing of the perforation gun 125. Looking at the reference time-pressure 240 and at the point (t1, p1), a pressure decreasing device is fired to create the underbalance 260. The point (t2, p2) is defined by a peak underbalance pressure after which the underbalance 260 starts to diminish. Again, looking at the reference time-pressure profile 240 and at the point (t2, p2), a pressure increasing device is actuated to create the overbalance 265. The point (t3, p3), is defined by a second peak overbalance pressure after which the overbalance 265 starts to diminish. Looking at the reference time-pressure profile 240 and at the point (t3, p3), a second pressure decreasing device is actuated to create the second underbalance 270. Thus, as the points (t1, p1) (i.e., the first reference pressure), (t2, p2) (i.e., the second reference pressure), and (t3, p3) (i.e., the third reference pressure) are defined by peak pressures, each of the first, second, and third reference pressures are pressures that are relative to the measured annular pressure itself. In this embodiment, the shape of the reference time-pressure profile 240 is determined before the perforating event and during pre-job planning. Generally, the reference time-pressure profile 240 is based on a modeling of the perforating event, with the perforating event generally including a period of time before, during, and after the perforation gun 125 is fired. In an exemplary embodiment, data used to create the reference time-pressure profile 240 includes perforation-related data, such as formation properties, wellbore design, and gun system features. The shape of the reference time-pressure profile 240, or the pressure trace, influences important outcomes including perforation tunnel cleanup, tunnel stability, sand control, and gun system integrity. The accuracy of the reference time-pressure profile 240 is dependent on the accuracy of the perforation-related data. Often, departure from the reference time-pressure profile 240 can lead to sub-optimal results, thus increasing the potential of tunnel collapse, premature sand production, impaired production/injectivity, and even failure of the gun string.

At the step 195, the assembly 90 is extended within the casing string 85. The assembly 90 may be conveyed to a desired depth in the wellbore 80 via various means, such as for example, via a "wireline," tubing conveyed perforation system ("TCP"), coil tubing, or "slickline."

At the step 200, the sensor 105a measures the downhole pressure within the annulus 95. In an exemplary embodiment, the sensor 105a measures the annular pressure while it is being extended within the casing string 85 and continues to measure the annular pressure while the assembly 90 is positioned at a perforation location within the casing string 85. However, in other embodiments, the sensor 105a begins to measure the annular pressure after a predetermined amount of time or other triggering event occurs after the assembly 90 is extended within the wellbore 80. Generally, and as the sensor 105a is in communication with the controller 110, the controller 110 receives the measured annular pressure and it may be stored within the database 175. Generally, the measured annular pressure forms a dynamic time-pressure profile that is associated with the perforation event, or a dynamic transient pressure profile.

At the step 205, the perforation gun 125 is fired. Based on the reference time-pressure profile 240, a timed event, or receipt of other instruction, the controller 110 actuates the perforation gun 125 to fire such that the casing string 85 is perforated. The firing of the perforation gun 125 corresponds to a point (t0, p0) of the reference time-pressure profile 240. The firing of the perforation gun 125 results in a pressure surge similar to the pressure surge 250 of the reference-time pressure profile 240. Generally, the firing of the perforation gun 125 results in a sharp pressure spike in the measured annular pressure to reestablish (after the casing string 85 is installed) the communication between the wellbore 80 and the formation 20. The perforation gun 125 may be actuated by a variety of means and is not limited to being actuated by the controller 110. For example, the perforation gun 125 may fire based on a timer within the perforation gun 125, a sensor on the perforation gun 125, or receipt of other instruction.

At the step 210, a first measured pressure is identified at the controller 110.

At the step 215, the controller 110 identifies or determines a first difference between the first measured pressure and a first reference pressure. In this embodiment and at the step 215, the input for the feedback control loop 180 is a previously measured annular pressure and the first measured annular pressure is a more-recently measured annular pressure. Thus, the controller 110 identifies when the measured peak overbalance pressure (point (t1, p1)) has been reached by comparing the previously measured annular pressure with the more-recently measured annular pressure (i.e., determining the first difference).

At the step 220, the annular pressure is adjusted using one of the PADs 115. Specifically, after the controller 110 determines that the measured annular pressure has reached the measured peak overbalance pressure, the controller 110 actuates the pressure decreasing device 130 so that the measured annular pressure will be reduced or temporarily decreased. The controller 110 may actuate the pressure decreasing device 130 or any of the PADs 115 by sending a signal to the first decreasing device 130 or any of the PADs 115. In this embodiment, actuating the pressure decreasing device 130 may result in an underbalance, similar to the first underbalance 260 of the reference-time pressure profile 240. Generally, the first underbalance 260 is to clean tunnels after gas fracturing.

At the step 225, a second measured pressure is identified at the controller 110.

At the step 230, the controller 110 identifies or determines a second difference between the second measured pressure and a second reference pressure. The step 230 is substantially similar to the step 215 except that the second reference pressure is a peak measured underbalance pressure. Thus, the controller 110 identifies when the measured peak underbalance pressure has been reached by comparing the previously measured annular pressure with the more-recently measured annular pressure (i.e., determining the second difference).

At the step 235, the annular pressure is adjusted using one of the PADs 115. Specifically, after the controller 110 determines that the measured annular pressure has reached the peak underbalance pressure (point (t2, p2)), the controller 110 actuates the pressure increasing device 120. Actuating the pressure increasing device 120 may result in a pressure overbalance similar to the pressure overbalance 265 of the reference-time pressure profile 240. Generally, the overbalance 265 is to crack the formation 20 rock by gas fracturing after the perforating tunnels have been cleaned.

Steps similar to the steps 210, 215, and 220 may be performed with a third reference pressure during which the controller 110 actuates a second pressure decreasing device 130 when the measured annular pressure reaches another peak overbalance (point (t3, p3)) so as to create a second pressure underbalance, similar to the second pressure underbalance 270 of the reference-time pressure profile 240. The second underbalance 270 is generally created to clean the tunnels after gas fracturing.

Figure 8:
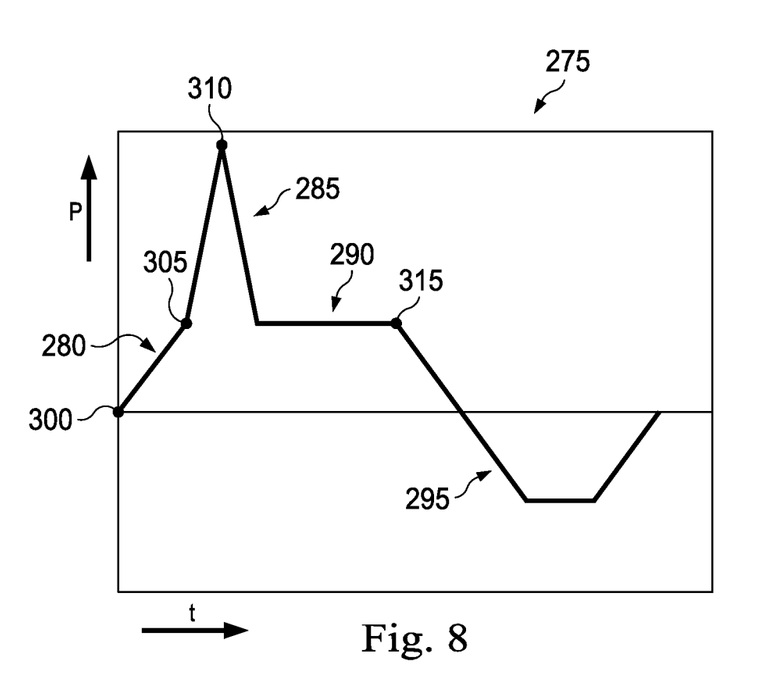
FIG. 8 is a graph illustrating another reference time-pressure profile, according to an exemplary embodiment of the present disclosure.

The method 185 may be altered in a variety of ways. For example, firing the perforation gun 125 at the step 205 may occur after the pressure increasing device 120 is actuated. FIG. 8 is a graph generally referred to by the reference numeral 275 that illustrates another reference time-pressure profile that includes a first pressure overbalance 280; a second pressure overbalance 285; a third pressure overbalance 290; and a first pressure underbalance 295. Using the time-pressure profile 275, the assembly 90 actuates a pressure increasing device 120 at or after a point indicated by the numeral 300. After the assembly 90 determines that the annular pressure has peaked in response to the actuation of the pressure increasing device 120, the assembly 90 fires the perforation gun 125 at a point indicated by the numeral 305, which results in the overbalance 285. After the assembly 90 determines that the annular pressure has peaked in response to the actuation of the perforation gun 125, the assembly 90 actuates another pressure increasing device 120 at the point indicated by the numeral 310, which results in the overbalance 290. After the assembly 90 determines that the annular pressure has peaked in response to the actuation of the another pressure increasing device 120, the assembly 90 actuates a pressure decreasing device 130 at the point indicated by the numeral 315, which results in the pressure underbalance 295.

The method 185 may be altered in additional ways. For example, the reference pressures may be associated with a maximum overbalance pressure so the controller 110 may actuate the pressure decreasing device 130 when the measured annular pressure is at or exceeds the maximum overbalance pressure. Thus, by reducing the annular pressure, the assembly 90 may prevent damage to the formation 20, the assembly 90, the casing string 85, and other structures due to over pressurization. Additionally, when the reference pressure is a maximum underbalance pressure, the controller 110 may actuate the pressure increasing device 120 when the measured pressure is at or exceeds the maximum underbalance pressure. Thus, by increasing the annular pressure, the assembly 90 may prevent damage to the formation, the assembly 90, the casing string 85 and other structures due to a pressure over underbalance. Additionally, the pressure increasing device 120 may be actuated when the controller 110 determines that a predetermined reference overbalance pressure has not been reached. Thus, if the measured overbalance is not sufficient, the assembly 90 may augment the overbalance by actuating the pressure increasing device 120. Similarly, the pressure decreasing device 130 may be actuated when the controller 110 determines that a predetermined reference underbalance pressure has not been reached. Thus, if the measured underbalance is not sufficient, the assembly 90 may augment the underbalance by actuating the pressure decreasing device 130. Additionally, and when the sensor 105a is one or more piston type accumulators such as for example, a gas-charged accumulator that is a hydraulic accumulator with gas as the compressible medium that is charged to specific reference pressure, the method 185 may be further altered in that the steps 210 and 215 are omitted and instead adjusting the annular pressure at the step 220 is in response to the movement of the piston of the piston type accumulator.

In another exemplary embodiment, data relating to a plurality of reference time-pressure profiles are be stored within the controller 110 of the assembly 90 at the step 190. Data relating to a plurality of reference time-pressure profile may be stored in the controller 110 of the assembly 90. Logic data may be stored in the controller 110 such that the controller 110 is capable of selecting—based on the parameters measured by the sensor 105a—the input (i.e., one of the plurality of the reference time-pressure profile) for the feedback control loop 180. Additionally, data relating to a default reference time-pressure profile may be stored in the controller 110 of the assembly 90 before the assembly 90 is extended within the wellbore 80. Then, upon measuring down-hole parameters using the sensor 105a, the controller may, based on the measured down-hole parameters, determine that a reference time-pressure profile that is different from the default reference time-pressure profile should be used as the input for the feedback control loop 180. That is, the assembly 90 may chose the input for the feedback control loop 180 based on feedback from the sensor 105a.

The order of the components (i.e., the PADs 115, the sensor sub 105, the controller 110) in the perforating assembly 90 is not fixed and can be interchanged as appropriate. Moreover, multiple components of each type can be included in the running string 75 to allow further flexibility. In an exemplary embodiment, a variety of assemblies 90 may be spaced along the running string 75.

In an exemplary embodiment, the method 185 and/or the use of the assembly 90 results in autonomous or "smart" control of the annular pressure during the perforating event. During the perforation event, the assembly 90 is capable of correcting and adjusting the annular pressure through the use of the PADs 115 to mirror the reference time-pressure profile. Thus, the assembly 90 is an active control assembly, considering it has control logic built in to mitigate any differences between the actual outcome (measured parameter input by the sensor 105a) and the goal or reference (parameter provided in the reference time-pressure profile). The method 185 and/or the use of the assembly 90 may result in increased production of hydrocarbons from the formation 20. Additionally, the method 185 and/or the use of the assembly 90 may result in improved injectivity during well treatments and better sand control. The method 185 and/or the use of the assembly 90 also may maintain wellbore integrity and protects completion equipment. Additionally, the method 185 and/or the use of the assembly 90 maintains gun system integrity. The method 185 and/or the use of the assembly 90 may also be used to extend the length of the time during which the annular pressure is adjusted during a transient pressure profile associated with a perforation event.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures. In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Thus, a method of perforating a casing string that extends within a wellbore has been described. Embodiments of the method may generally include, measuring downhole pressure within the casing string; firing a perforation gun that is positioned within the casing string to increase the downhole pressure within the casing string; and adjusting the downhole pressure based on the measured downhole pressure; wherein adjusting the downhole pressure comprises actuating a first pressure generator. For any of the foregoing embodiments, the method may include any one of the following elements, alone or in combination with each other:

The first pressure generator includes at least one of a pressure reducer and a pressure increaser.

Actuating the first pressure generator includes at least one of actuating the pressure reducer after the measured downhole pressure is at or exceeds a maximum overbalance pressure; and actuating the pressure increaser after the measured downhole pressure is at or exceeds a maximum underbalance pressure.

Actuating the first pressure generator includes at least one of: actuating the pressure reducer after the measured downhole pressure reaches a peak measured overbalance pressure; and actuating the pressure increaser after the measured downhole pressure reaches a peak measured underbalance pressure.

Storing a reference time-pressure profile within a tool that is positioned within the casing string.

Continuing to measure the downhole pressure within the casing string over a period of time to form a dynamic time-pressure profile.

Identifying a first measured pressure associated with a first instance of time within the dynamic time-pressure profile.

Determining a first difference between the first measured pressure and a first reference pressure associated with the first instance of time within the reference time-pressure profile; wherein actuating the first pressure generator is further based on the first determined difference.

Identifying a second measured pressure associated with a second instance of time within the dynamic time-pressure profile.

Determining a second difference between the second measured pressure and a second reference pressure associated with the second instance of time within the reference time-pressure profile.

Adjusting the downhole pressure further includes actuating a second pressure generator.

Actuating the second pressure generator is based on the second determined difference.

Adjusting the downhole pressure based on the measured downhole pressure further includes actuating a second pressure generator.

The first pressure generator is a pressure reducer.

The second pressure generator is a pressure increaser.

Actuating the first pressure generator results in a pressure underbalance within the casing string.

Actuating the second pressure generator results in a pressure overbalance within the casing string.

Extending a feedback control loop within the casing string.

Receiving the measured pressure at a controller of the feedback control loop.

Comparing, using the controller, the measured pressure with a reference pressure that is stored within the controller.

Sending a signal from the controller to the first pressure generator.

Actuating the first pressure generator is in response to the signal.

Thus, a method of controlling a dynamic time-pressure profile associated with a perforation event has been described. Embodiments of the apparatus may generally include extending a perforation assembly within a casing string; firing a perforation gun of the perforation assembly; measuring, using a sensor of the perforation assembly, pressure within the casing string, wherein the measured pressure forms the dynamic time-pressure profile; identifying a first measured pressure within the dynamic time-pressure profile; identifying, using a controller of the perforation assembly, a first difference between the first measured pressure and a first reference pressure; and adjusting, using a first pressure generator of the perforation assembly, the pressure in response to the first difference to control the dynamic time-pressure profile; wherein the sensor, the controller, and the first pressure generator provide a feedback control loop. For any of the foregoing embodiments, the apparatus may include any one of the following elements, alone or in combination with each other:

Identifying a second measured pressure within the dynamic time-pressure profile.

Identifying, using the controller, a second difference between the second measured pressure and a second reference pressure.

Adjusting, using a second pressure generator of the perforation assembly, the pressure in response to the second difference to control the dynamic time-pressure profile.

Adjusting the pressure, using the first pressure generator of the perforation assembly, in response to the first difference includes actuating a pressure reducer to create a pressure underbalance in the casing string.

Adjusting the pressure, using the first pressure generator of the perforation assembly, in response to the first difference includes actuating a pressure increaser to create a pressure overbalance within the casing string.

The first reference pressure is a time-dependent reference pressure.

The first reference pressure is one reference pressure from a plurality of reference pressures that form a reference time-pressure profile.

Selecting, while the perforation assembly extends within the casting string, the reference time-pressure profile from a plurality of time-pressure profiles.

Selecting the reference time-pressure profile is based on the first measured pressure.

Thus, apparatus for controlling a dynamic transient time-pressure profile associated with a perforation event has been described. Embodiments of the apparatus may generally include a downhole tool including: a controller; a pressure sensor in communication with the controller to provide feedback to the controller; and a first pressure generator in communication with the controller; wherein the first pressure generator, the pressure sensor, and the controller provide a feedback control loop. For any of the foregoing embodiments, the apparatus may include any one of the following elements, alone or in combination with each other:

The tool further includes a perforation gun.

The tool further includes a second pressure generator.

The sensor is one of a mechanical pressure sensor and an electrical pressure sensor.

The first pressure generator is a one of: a pressure decreaser; and a pressure increaser.

The second pressure generator is the other of: the pressure decreaser; and the pressure increaser.

The controller actuates the first pressure generator in response to a measured pressure received from the pressure sensor.

The foregoing description and figures are not drawn to scale, but rather are illustrated to describe various embodiments of the present disclosure in simplistic form. Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Accordingly, the intention is to cover all modifications, equivalents and alternatives falling within the spirit and scope of the disclosure as defined by the appended claims.

What is claimed is:

1. A method of perforating a casing string that extends within a wellbore, the method comprising:
   measuring downhole pressure within the casing string;
   firing a perforation gun that is positioned within the casing string to increase the downhole pressure within the casing string; and
   adjusting the downhole pressure based on the measured downhole pressure;
   wherein adjusting the downhole pressure comprises actuating a first pressure generator;
   wherein the first pressure generator comprises at least one of:
      a pressure reducer; and
      a pressure increaser; and
   wherein actuating the first pressure generator comprises at least one of:
      actuating the pressure reducer after the measured downhole pressure is at or exceeds a maximum overbalance pressure;
      actuating the pressure increaser after the measured downhole pressure is at or exceeds a maximum underbalance pressure;
      actuating the pressure reducer after the measured downhole pressure reaches a peak measured overbalance pressure; and
      actuating the pressure increaser after the measured downhole pressure reaches a peak measured underbalance pressure.

2. The method of claim 1,
   wherein actuating the first pressure generator comprises at least one of:
      actuating the pressure reducer after the measured downhole pressure is at or exceeds the maximum overbalance pressure; and
      actuating the pressure increaser after the measured downhole pressure is at or exceeds the maximum underbalance pressure.

3. The method of claim 1,
   wherein actuating the first pressure generator comprises at least one of:
      actuating the pressure reducer after the measured downhole pressure reaches the peak measured overbalance pressure; and
      actuating the pressure increaser after the measured downhole pressure reaches the peak measured underbalance pressure.

4. The method of claim 1, wherein the method further comprises:
   storing a reference time-pressure profile within a tool that is positioned within the casing string;
   continuing to measure the downhole pressure within the casing string over a period of time to form a dynamic time-pressure profile;
   identifying a first measured pressure associated with a first instance of time within the dynamic time-pressure profile; and
   determining a first difference between the first measured pressure and a first reference pressure associated with the first instance of time within the reference time-pressure profile;
   wherein actuating the first pressure generator is further based on the first determined difference.

5. The method of claim 4, wherein the method further comprises:
   identifying a second measured pressure associated with a second instance of time within the dynamic time-pressure profile; and
   determining a second difference between the second measured pressure and a second reference pressure associated with the second instance of time within the reference time-pressure profile;
   wherein adjusting the downhole pressure further comprises actuating a second pressure generator; and
   wherein actuating the second pressure generator is based on the second determined difference.

6. The method of claim 1,
   wherein adjusting the downhole pressure based on the measured downhole pressure further comprises actuating a second pressure generator;
   wherein the first pressure generator is a pressure reducer; and
   wherein the second pressure generator is a pressure increaser.

7. The method of claim 6,
   wherein actuating the first pressure generator results in a pressure underbalance within the casing string; and
   wherein actuating the second pressure generator results in a pressure overbalance within the casing string.

8. The method of claim 1, further comprising:
   extending a feedback control loop within the casing string;
   receiving the measured pressure at a controller of the feedback control loop;
   comparing, using the controller, the measured pressure with a reference pressure that is stored within the controller; and
   sending a signal from the controller to the first pressure generator;
   wherein actuating the first pressure generator is in response to the signal.

9. A method of controlling a dynamic time-pressure profile associated with a perforation event, the method comprising:
   extending a perforation assembly within a casing string;
   firing a perforation gun of the perforation assembly;

measuring, using a sensor of the perforation assembly, pressure within the casing string, wherein the measured pressure forms the dynamic time-pressure profile;

identifying a first measured pressure within the dynamic time-pressure profile;

identifying, using a controller of the perforation assembly, a first difference between the first measured pressure and a first reference pressure; and adjusting, using a first pressure generator of the perforation assembly, the pressure in response to the first difference to control the dynamic time-pressure profile;

wherein the sensor, the controller, and the first pressure generator provide a feedback control loop.

10. The method of claim 9, the method further comprising:

identifying a second measured pressure within the dynamic time-pressure profile;

identifying, using the controller, a second difference between the second measured pressure and a second reference pressure; and adjusting, using a second pressure generator of the perforation assembly, the pressure in response to the second difference to control the dynamic time-pressure profile.

11. The method of claim 9, wherein adjusting the pressure, using the first pressure generator of the perforation assembly, in response to the first difference comprises actuating a pressure reducer to create a pressure underbalance in the casing string.

12. The method of claim 9, wherein adjusting the pressure, using the first pressure generator of the perforation assembly, in response to the first difference comprises actuating a pressure increaser to create a pressure overbalance within the casing string.

13. The method of claim 9,
wherein the first reference pressure is a time-dependent reference pressure; and
wherein the first reference pressure is one reference pressure from a plurality of reference pressures that form a reference time-pressure profile.

14. The method of claim 13, further comprising selecting, while the perforation assembly extends within the casting string, the reference time-pressure profile from a plurality of time-pressure profiles;
wherein selecting the reference time-pressure profile is based on the first measured pressure.

15. An apparatus for controlling a dynamic time-pressure profile associated with a perforation event, the apparatus comprising:
a downhole tool comprising:
a controller;
a pressure sensor in communication with the controller to provide feedback to the controller; and
a first pressure generator in communication with the controller;
wherein the first pressure generator, the pressure sensor, and the controller provide a feedback control loop;
wherein the controller comprises a computer readable medium operably coupled thereto, the computer readable medium storing a reference time-pressure profile;
wherein the controller is configured to determine a difference between a measured pressure from the pressure sensor and a reference pressure within the reference time-pressure profile, and send a signal to the first pressure generator based on the difference; and
wherein the first pressure generator is configured to actuate in response to the signal.

16. The apparatus of claim 15, wherein the tool further comprises a perforation gun.

17. The apparatus of claim 15, wherein the tool further comprises a second pressure generator.

18. The apparatus of claim 17,
wherein the first pressure generator is a one of:
a pressure decreaser; and
a pressure increaser; and
wherein the second pressure generator is the other of:
the pressure decreaser; and
the pressure increaser.

19. The apparatus of claim 15, wherein the sensor is one of a mechanical pressure sensor and an electrical pressure sensor.

* * * * *